F. L. STUART.
LOADING AND STORING APPARATUS.
APPLICATION FILED OCT. 13, 1915.
1,241,053.
Patented Sept. 25, 1917.
12 SHEETS—SHEET 2.
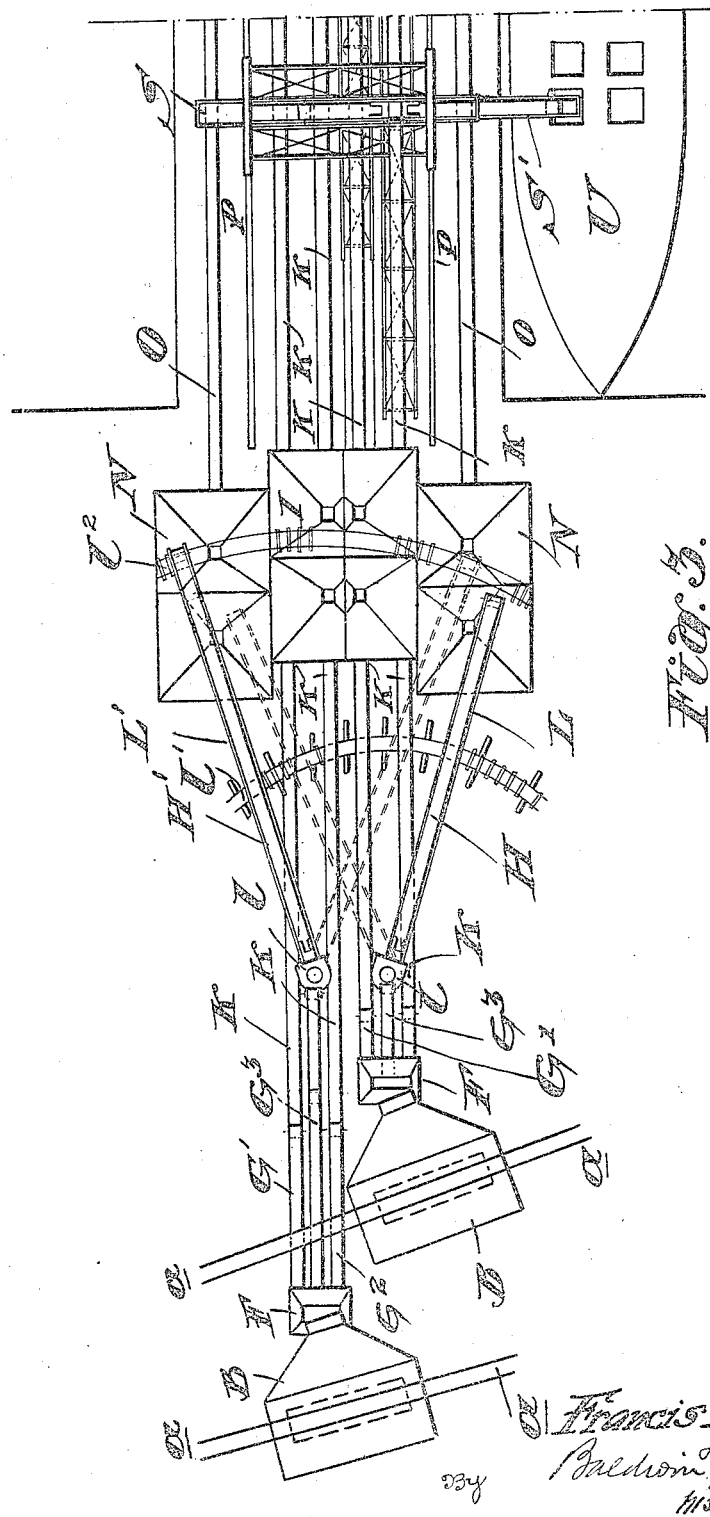

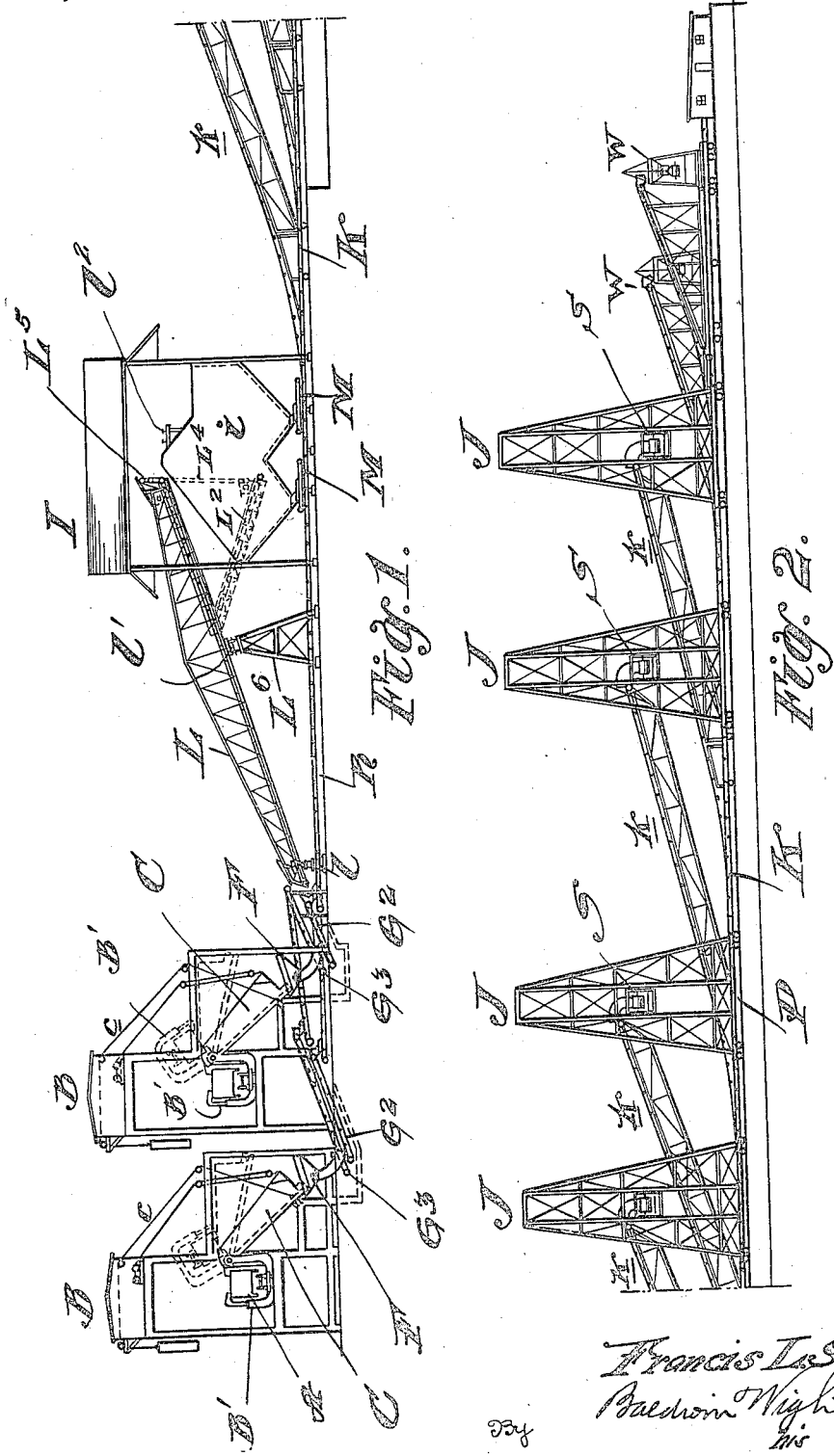

F. L. STUART.
LOADING AND STORING APPARATUS.
APPLICATION FILED OCT. 13, 1915.

1,241,053.

Patented Sept. 25, 1917.
12 SHEETS—SHEET 3.

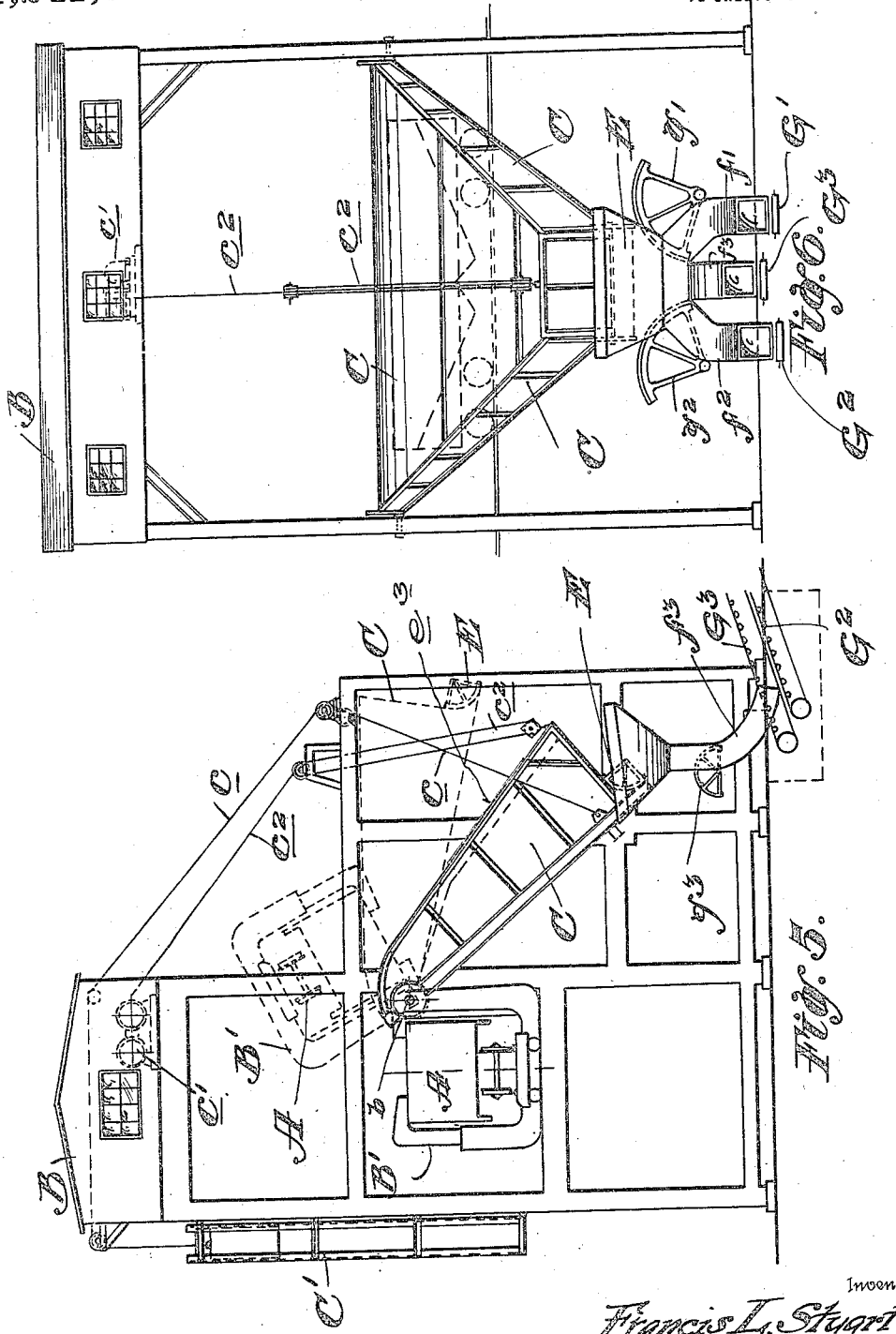

F. L. STUART.
LOADING AND STORING APPARATUS.
APPLICATION FILED OCT. 13, 1915.

1,241,053.

Patented Sept. 25, 1917.
12 SHEETS—SHEET 5.

Inventor
Francis L. Stuart,
By Baldwin Wight
his Attorneys

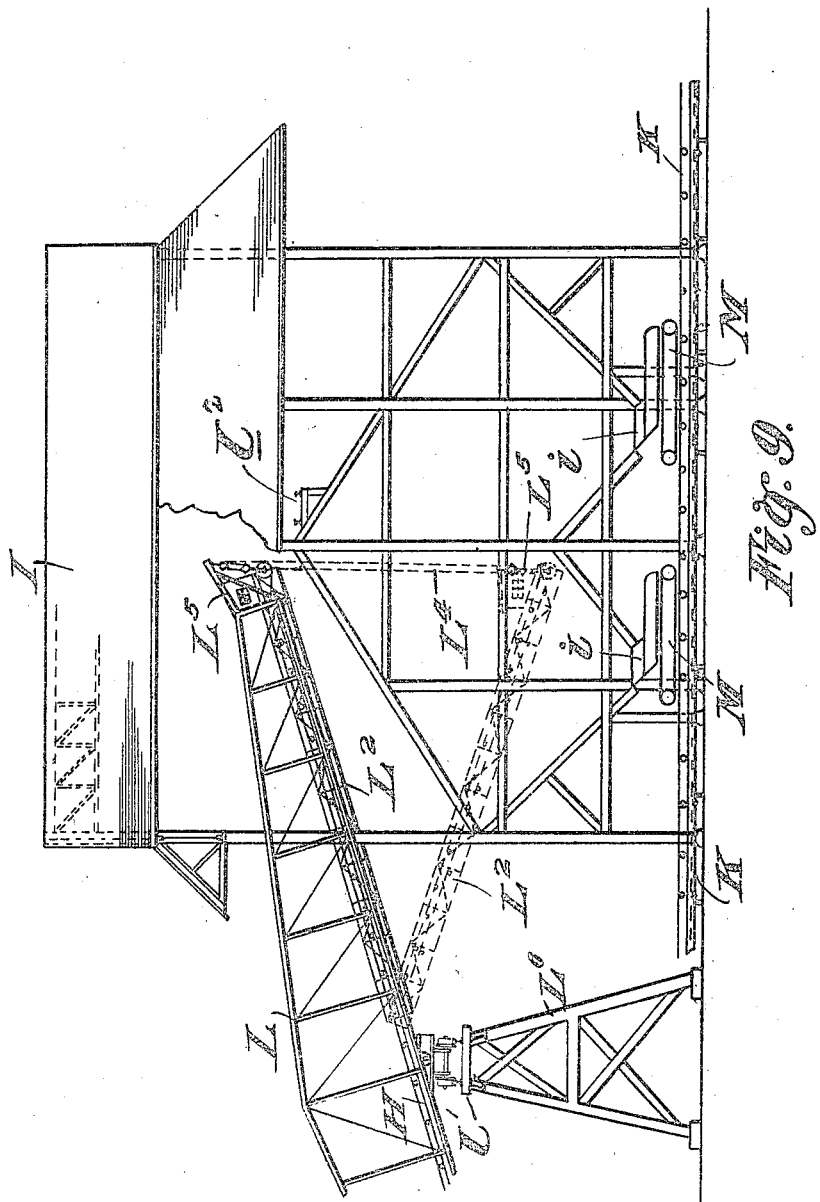

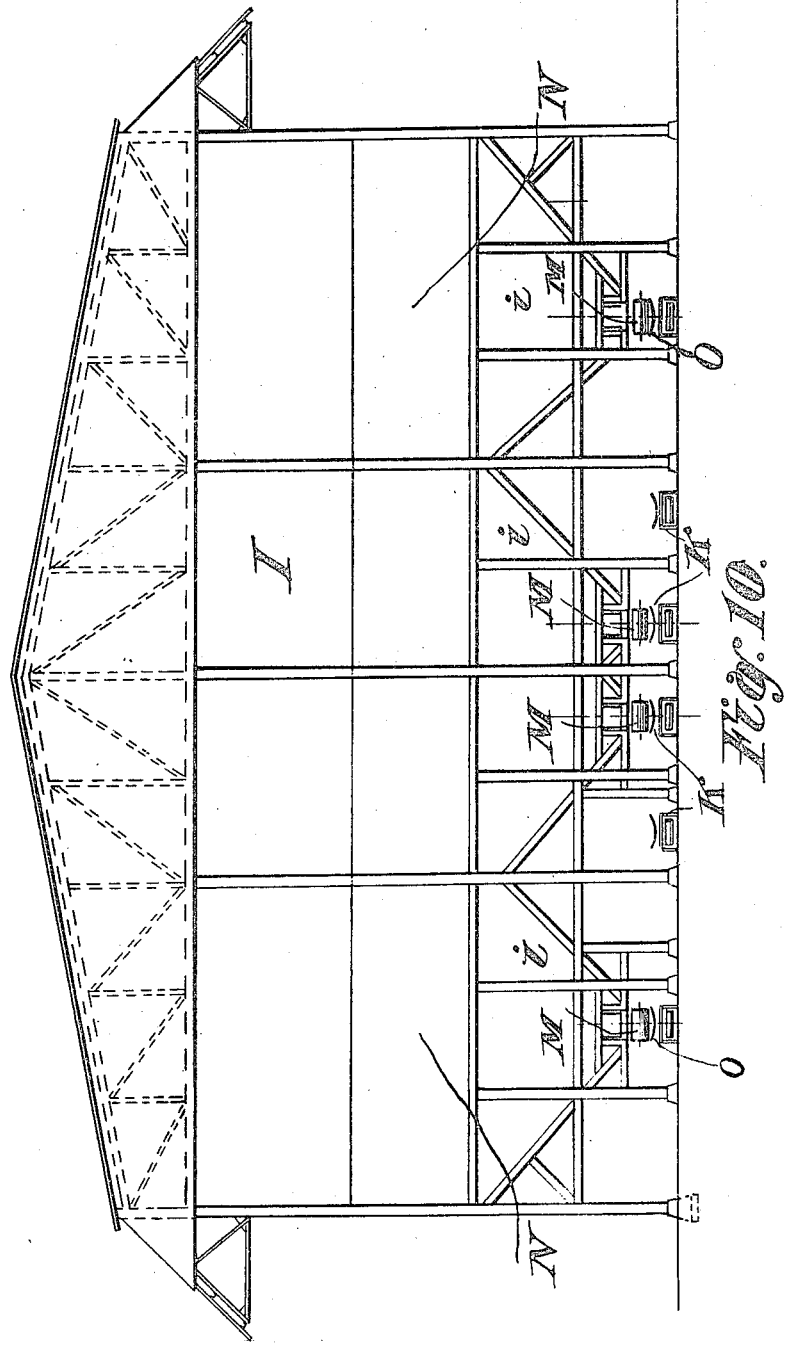

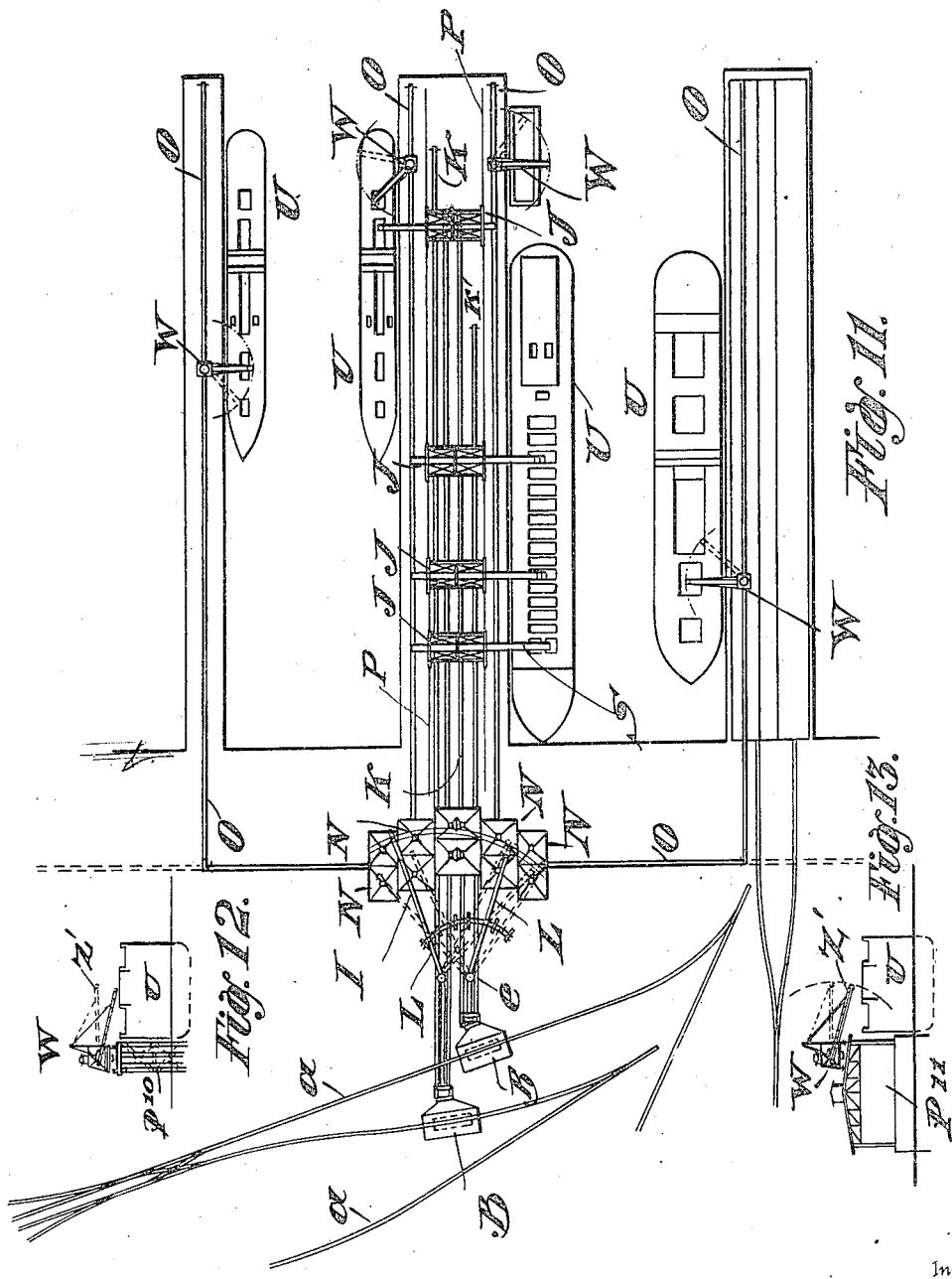

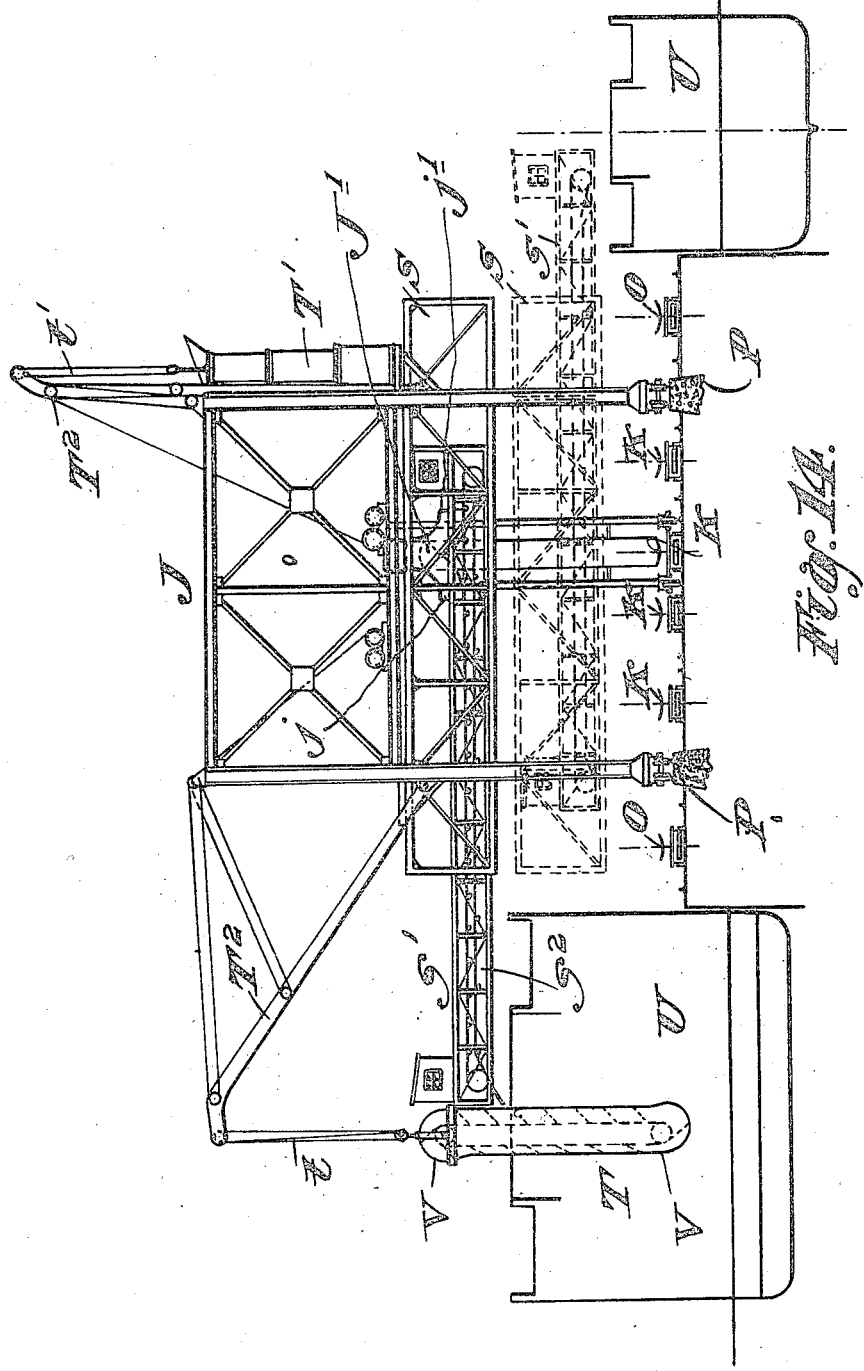

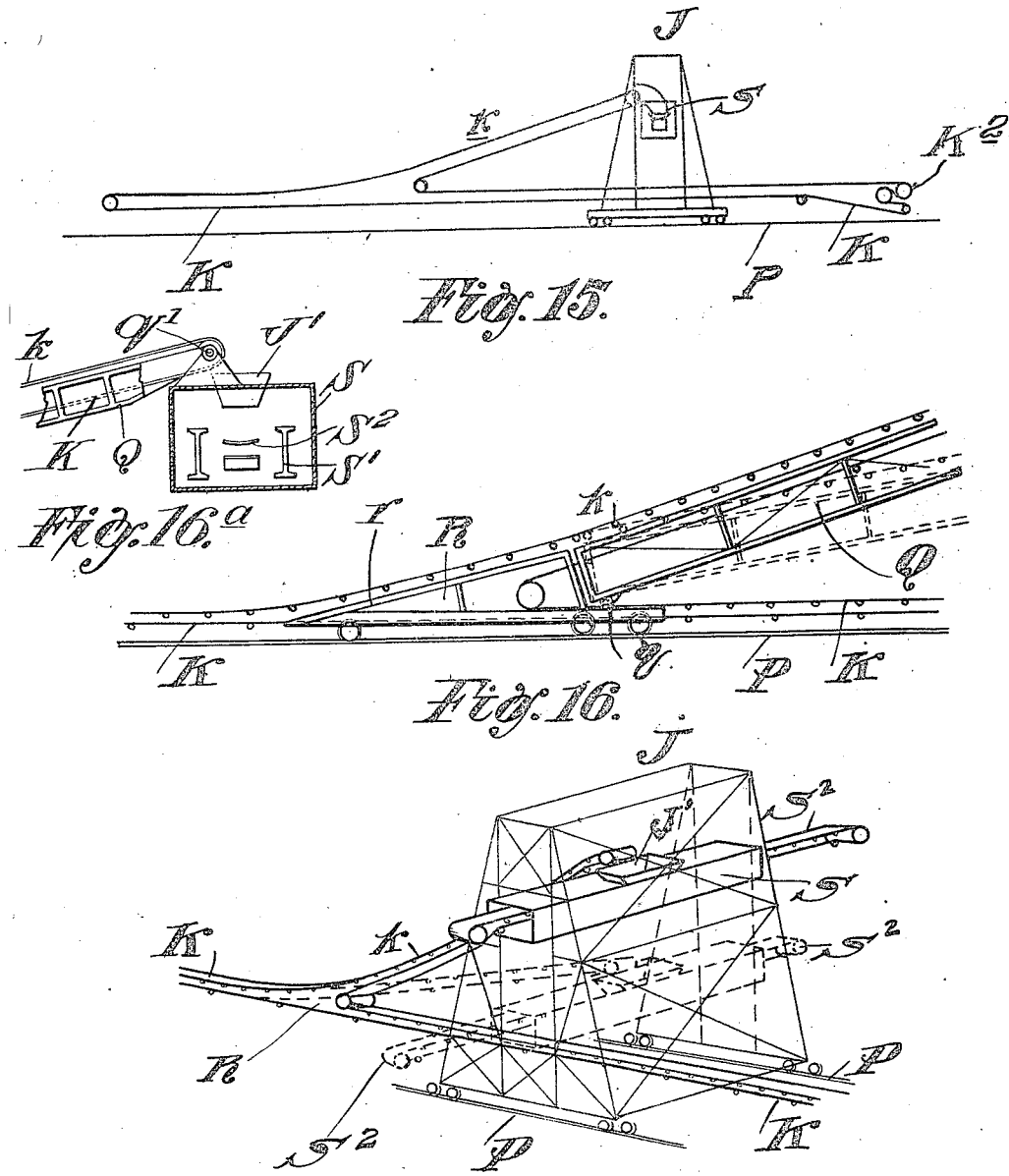

F. L. STUART.
LOADING AND STORING APPARATUS.
APPLICATION FILED OCT. 13, 1915.

1,241,053.

Patented Sept. 25, 1917.
12 SHEETS—SHEET 11.

Inventor
Francis L. Stuart.
By Baldwin Wight
his Attorneys

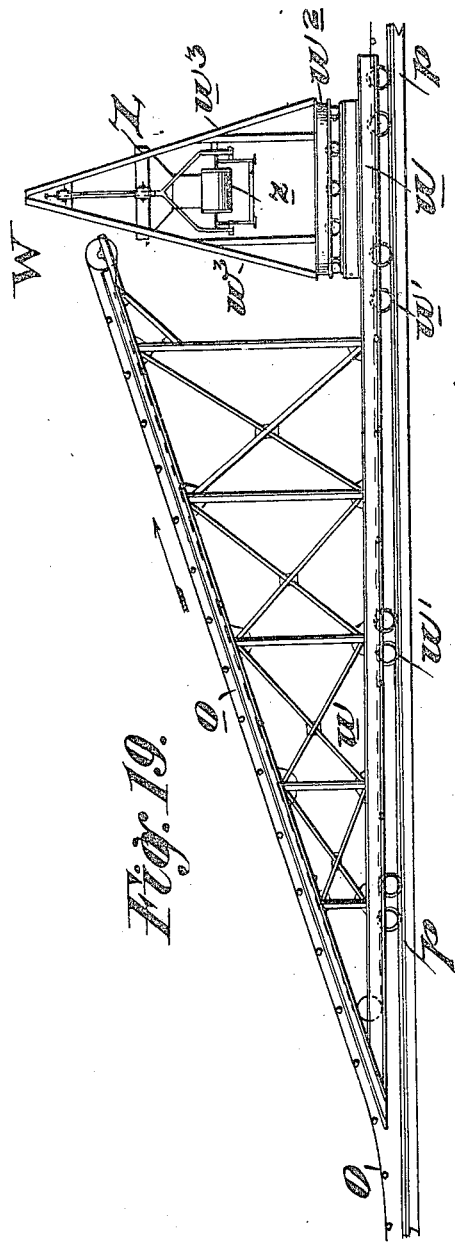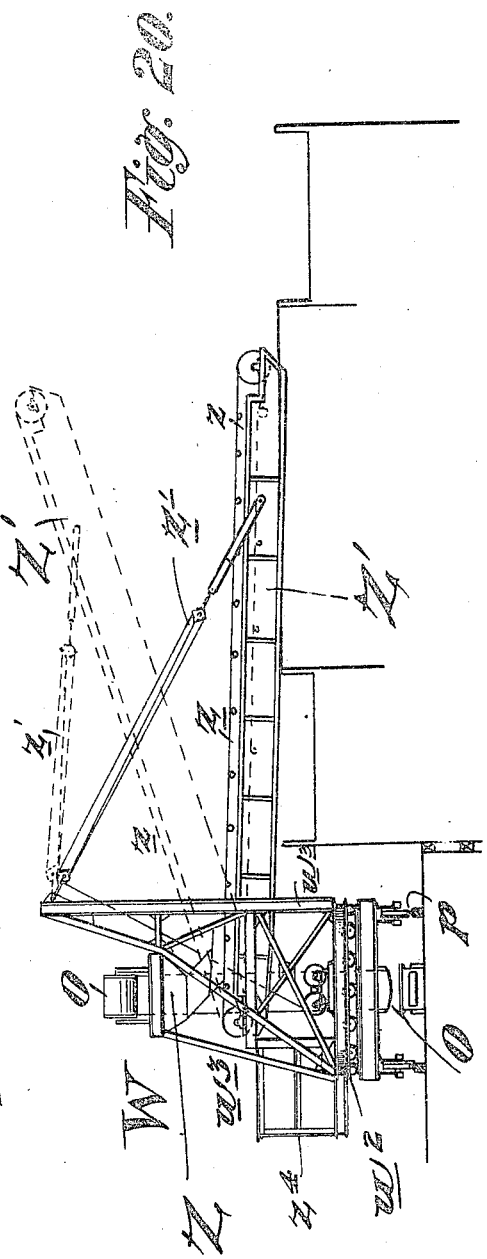

UNITED STATES PATENT OFFICE.

FRANCIS LEE STUART, OF BALTIMORE, MARYLAND.

LOADING AND STORING APPARATUS.

1,241,053.  Specification of Letters Patent.  Patented Sept. 25, 1917.

Application filed October 13, 1915. Serial No. 55,620.

*To all whom it may concern:*

Be it known that I, FRANCIS LEE STUART, a citizen of the United States, residing in Baltimore, Maryland, have invented certain new and useful Improvements in Loading and Storing Apparatus, of which the following is a specification.

This invention relates to apparatus for loading and storing coal, ore, etc., of the class in which means is provided for transferring the material from cars or other carriers to conveyers which deliver it to storage bins or piles or to receiving carriers such as ships, barges or other vessels or carriers, and the object of the invention is to provide apparatus of this class of such construction that it may quickly and easily handle large quantities of material with a minimum amount of breakage.

Although my invention is not limited in its use to the particular form of unloading and loading machines hereinafter described, the apparatus made in accordance with the particular embodiment of my invention here shown comprises novel means for transferring material from loaded cars to conveyers which carry it to storage bins and to loading mechanism of an improved kind which delivers it to ships, barges or other vessels. It also comprises novel means to which the material is conveyed for "trimming" or completing the loading operation or for loading small vessels or other carriers.

The mechanism for transferring the material from the loaded cars to the conveyers comprises a bin into which the material is delivered and which is lowered after receiving a charge until it reaches the conveyers which receive the charge and carry it to a place for storage or to mechanism which delivers it to the vessel to be loaded.

Some of the conveyers carry the material over inclined trusses provided with vertically adjustable booms which may be gradually raised as the piles increase in size in the bins to which they deliver. Other conveyers carry the material to what is called loading towers, each of which is movable to any desired position and each of which is equipped with a vertically adjustable cage carrying a horizontally adjustable "shuttle" equipped with a conveyer which receives the material entering the tower and delivers it to a chute, lowerator or other downwardly moving conveyer which deposits the material in a vessel or elsewhere if desired. The chute or lowerator is swung from a boom on which it is vertically adjustable and which is itself movable upwardly, outwardly and inwardly to accommodate different conditions.

Other conveyer belts carry the material to trimmers of novel construction which may themselves be employed for loading, but which are especially designed for trimming or completing the loading of vessels. Each of the trimmers comprises a movable frame supporting a hopper which receives the material from an elevated portion of a conveyer belt and which delivers it to a conveyer carried by a boom which is made adjustable in such manner as to discharge the material at any desired elevation. The trimmers are of smaller dimensions than the towers and may be shifted, adjusted and operated with much less power.

As a whole the organization of the apparatus is such that coal, ore and other like material may be received from cars, conveyed to suitably located storage houses, or to loading towers or trimmers with great facility, or conveyed from the storage houses to the towers or to the trimmers when needed.

In the accompanying drawings,

Figure 1 shows a side elevation of a portion of the apparatus, and

Fig. 2 shows a side elevation of the remaining portion thereof.

Fig. 3 is a top plan view of that portion of the apparatus shown in Fig. 1, and

Fig. 5, which is on a somewhat larger scale, shows a side elevation of the means employed for receiving the material from loaded cars and lowering it to conveyers.

Fig. 6 shows an end elevation of the same.

Figure 4:
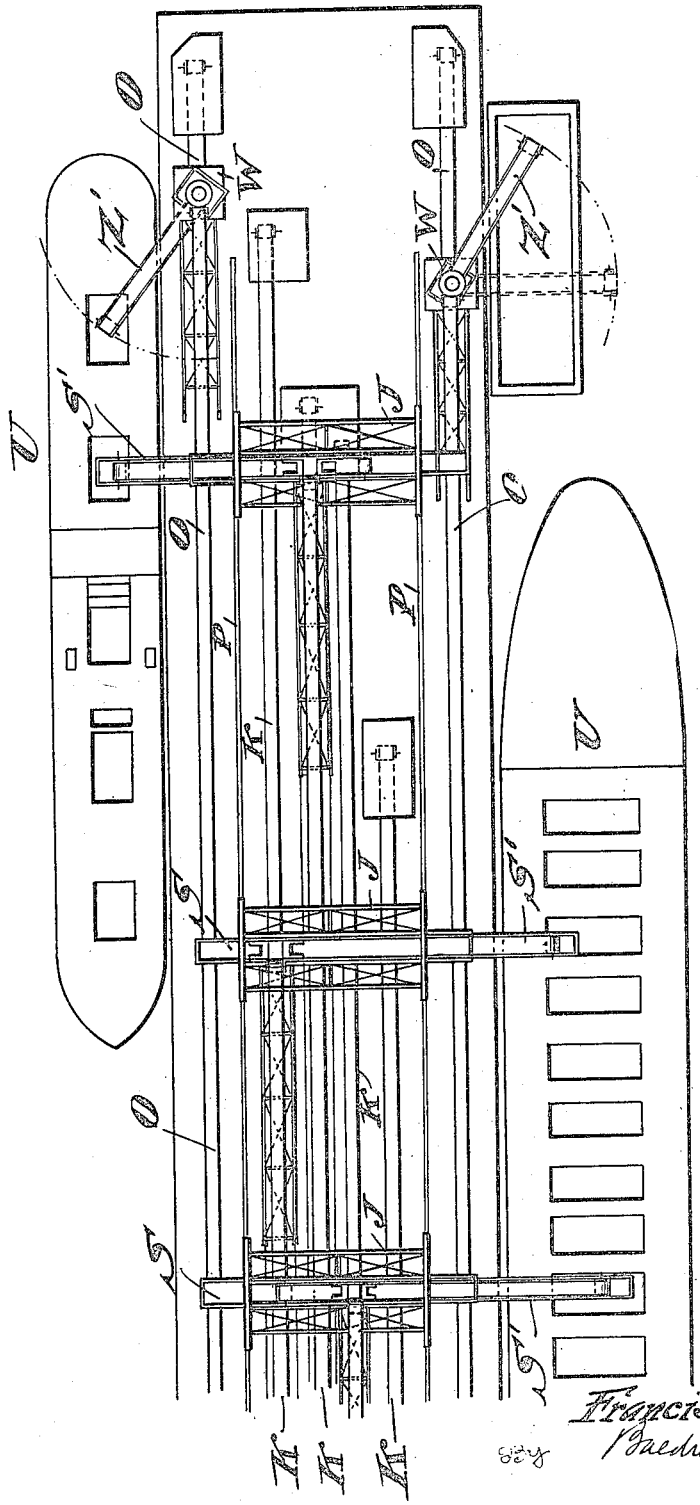
Fig. 4 shows a top plan of that portion shown in Fig. 2.
Figure 7:
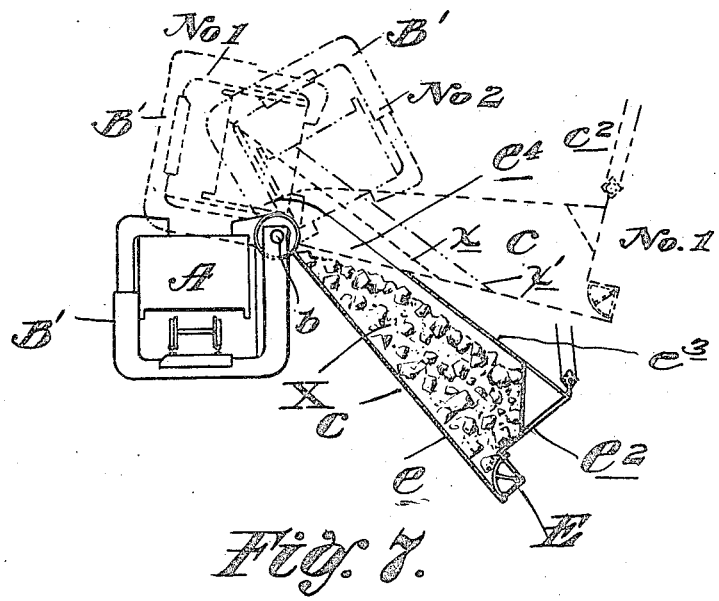

Fig. 7 is a detail view illustrating particularly how the material is transferred from the cars to the lowering bin.

Figure 8:
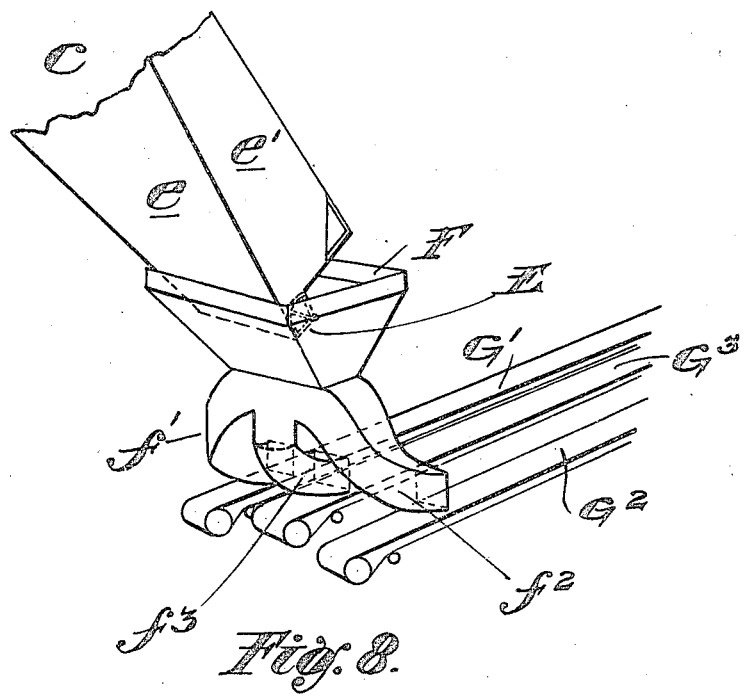

Fig. 8 is a perspective view showing how the lowering bin delivers the material to the conveyers.

Fig. 9 shows a side elevation of the storage house, some parts being broken away in order to show the manner in which the material carried by the inclined conveyers is delivered at different elevations in the bins.

Fig. 10 shows an end elevation of the storage house and indicates how the several conveyers beneath the bins may be fed.

Fig. 11 is a top plan view showing how the loaded cars may be directed along shore to the dumping apparatus and how the material may be distributed to the storage bins, loading towers and trimmers and from said towers and trimmers to vessels alongside the piers or bulkheads.

Fig. 12 indicates how a trimmer may be supported on piers, and

Fig. 13 indicates how a trimmer may be supported on a warehouse.

Fig. 14 shows an end elevation of one of the loading towers and illustrates particularly the manner in which the vertically adjustable shuttle cage supports the horizontally adjustable shuttle equipped with a belt conveyer which delivers to a lowerator carried by an adjustable boom.

Fig. 15 is a diagrammatic view mainly showing how the conveyer carries the material to a tower and how the tower may be moved from place to place without disturbing the operative relation of the conveyer thereto.

Fig. 16 illustrates the means for adapting the conveyer to different angles of adjustment of that part thereof which rises to the upper portion of the tower containing the shuttle conveyer.

Fig. 16$^A$ indicates how a conveyer may be attached to the shuttle cage.

Fig. 17 is a diagrammatic view showing in outline and in perspective the devices employed for transferring the material from the main conveyer to the shuttle conveyer.

Figure 18:
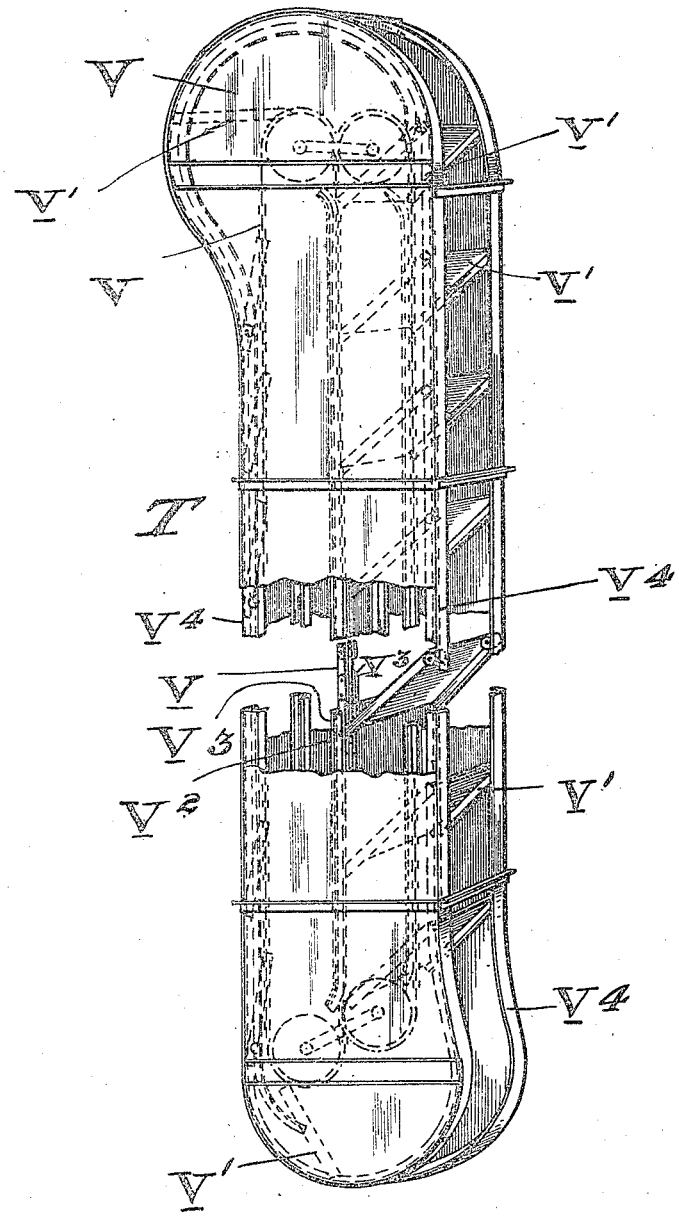

Fig. 18 is a perspective view of the lowerator preferably employed.

Fig. 19 shows a side elevation of a portion of one of the conveyers and one of the trimmers and indicates how the material is transferred from the conveyer to the trimmer.

Fig. 20 shows an end elevation of one of the trimmers and indicates how it is adjusted and operated to deliver to a vessel.

The cars A, which may be of any well known construction, pass from tracks $a$ (Fig. 11) on shore to dumping towers B, also located on shore, and provided with cradles B' which are hinged at $b$ (Fig. 5) to the tower frame and which may be raised and lowered and revolved or otherwise operated by any appropriate mechanism. It will be understood, of course, that it is immaterial whether the cradle of the car dumper has a permanent-hinged connection at $b$ with the tower or whether the cradle is elevated from the lower part of the tower until it engages the pivot members at $b$ and is then tilted or revolved. Each car delivers to a lowering bin C hinged at $b$ and counterbalanced by weights C' connected by cables $c$ to the outer portion of the bin. Any suitable mechanism may be employed for raising and lowering the bins at any desired speed, which will depend somewhat upon the character or kind of material being handled. I have shown, by way of example, a hoisting drum $c'$ connected by suitable tackle $c^2$ to each bin near its outer free end. Each lowering bin has a closed bottom $e$, sides $e'$, a closed outer end $e^2$ and a discharge gate E. A top $e^3$ closes the outer portion of the bin but a receiving opening is provided at $e^4$. When the car is elevated to the position No. 1, shown by dotted lines in Fig. 7, the bin should stand at position No. 1 in the same figure and while in this position the material will usually lie in the condition indicated at $x$. When the car moves to the position No. 2, the material will usually assume the condition indicated at $x'$, and when the bin is lowered to the position shown by full lines in Fig. 7 it will have received the full load, as indicated at X and is then ready to be delivered. It will be observed that the material is transferred from the car to the lowering bin gradually and without material fall and therefore with but little breakage.

When the bin is lowered to the proper extent the gate E is opened and the material passes to a hopper F provided, in this instance, with three chutes $f'$, $f^2$, $f^3$, which deliver to three conveyers, $G'$, $G^2$, $G^3$, which are called feeder belts, being of relatively short length and delivering to other or conveyer belts of greater length. By employing such feed belts the cost of maintenance is much reduced as these belts are subjected to considerable wear and tear and require more frequent renewal than the conveyer belts. The conveyer belts which receive the material from the feeder belts are preferably run at much higher speed than the feeder belts, the feeder belts receiving the material from the three chutes and delivering the material onto the longer and more rapidly moving conveyer belts in such a manner that when the material is received onto the last mentioned belts it will have less tendency to wear or tear the latter than would be the case if the material were fed directly from the feeding chutes to the more rapidly moving belts. Each of the chutes $f'$, $f^2$, $f^3$, is equipped with a gate $g'$, $g^2$, $g^3$, by means of which the material may be delivered to any one or more of the feeder belts, which feeder belts deliver to conveyer belts H, H', leading to the storage house I or to conveyer belts K leading to the loading towers J. It will therefore be seen that each hopper F delivers to three feed belts, one of which delivers to the belt H or H' and the other two to the belts K which extend to the loading towers.

In the drawings I have shown two sets of mechanism for transferring material from loaded cars to conveyer belts, but it will be understood that only one transferring mechanism may be employed or that a larger number of such transferring mechanisms may be used. As shown the conveyer belt H is supported on an inclined truss or bridge L mounted at its lower end $l$ to swing about a vertical pivot and sustained about midway between its upper and lower ends by trolleys moving over a curved track $l'$ supported on a vertical frame $L^6$. The belt H' is supported on an inclined truss or bridge L', mounted at its lower end $l$ to swing about a vertical axis and sustained at its upper end by a curved track $l^2$ attached to the store house.

The arrangement is such that the trusses may be swung in their pivots to carry their upper or outer ends to different parts of the store house. Each truss is equipped with a hinged section or boom $L^2$ which does not extend to the extreme upper end of the truss and serves to lower and raise the upper portion of the conveyer in the manner indicated in Figs. 1 and 9. The storage house I is provided with bins $i$ to which the material is delivered by the conveyers H, H', these conveyers being swung horizontally from one bin to the other as indicated and being raised and lowered in such manner as to deliver the material gently with but little fall. Each truss L or L' is equipped with raising and lowering tackle $L^4$ of any suitable kind which is preferably operated from a house $L^5$ located on the upper or outer end of the boom $L^2$. The arrangement is such, as shown, that either one of the trusses may be swung horizontally freely to any desired extent to any part of the storage house I or to the bins N hereinafter referred to.

It will be observed that one of the tracks $l'$ is concentric with the vertical axis about which one of the trusses or bridges L is swung and that the other track $l^2$ is concentric with the pivotal axis about which the other truss or bridge is swung, the two tracks being essential because the two trusses or bridges L and L' do not swing about coincident axis.

By arranging one of these tracks near the center of one of the bridges or trusses L and the other near the upper end of the other bridge or truss, I avoid the use of crossing frogs which would be required if the two tracks were arranged so as to cross each other, and at the same time these tracks will not interfere with the swinging movements of the booms or arms $L^2$.

The conveyers K pass under the bin house and may convey the material directly from the feed belts G', $G^2$, or may receive the material from the bins, being supplied therefrom by the feed belts M, which are beneath discharge chutes at the bottom of the bins I and N and above the conveyer belts K and O, as shown particularly in Figs. 9 and 10.

It will be observed that the bins are provided with sets or pairs of discharge spouts, there being two such spouts, one in advance of the other above each of the belts K and O. By providing two spouts above each belt in the manner shown particularly in Fig. 9, I am enabled to obtain maximum capacity in the storage house from the highest delivering point of conveyers H and H' and a given ground space, that is to say, greater capacity is obtained from the highest delivery point of conveyers than would be the case if the bins discharged onto the several belts from single spouts.

It should be understood that at times it is more convenient to convey the material to the storage bins than to the loading towers J and at other times to draw on the bins for supplying the towers, and it will be further understood that when there are no vessels to be loaded the apparatus may be operated to receive the material coming in on cars and to store it for future use.

As indicated in Fig. 3 and in Fig. 11, I preferably provide the storage house with bins N for supplying the trimmers to which the conveyer belts O are guided. The conveyers H, H' are used for feeding the bins N in the manner shown in Fig. 3, but before describing the trimmers I will refer to the towers J of which any desired number may be used. Four such towers are shown and each of these is supplied by a conveyer belt K in the manner indicated. There is preferably one conveyer belt K for each tower and each belt is driven in any suitable way.

Fig. 15 indicates diagrammatically how each of the four belts K are guided and it will be observed that a portion, $k$, of the belt extends diagonally upward and rearward to an elevated portion of one of the towers J. The four towers are each movable along the rails of a track P, and the belt K leading to each tower is so guided that it is held at the proper tension whatever be the position of the tower on the track. The inclined portion of the belt K is supported by a truss Q (Fig. 16) which is pivotally connected at any convenient point as at $q$ to a truck R connected to move with the tower J and having an inclined upper portion $r$ interposed between the inclined and the straight portion of the belt. The truss Q is vertically adjustable to different angles about the pivot $q$ as indicated by dotted lines and the inclined part $r$ of the truck affords means for holding the belt properly at that portion thereof which merges from a straight to an inclined part. As indicated in Fig. 15 the belt K is an endless one. It may be driven in any suitable way by power applied at any suitable part of the belt, for instance, at $K^2$. This main conveyer belt K extends from the lowering bin or from the storage bin, before mentioned, to a loading tower, and the portion of the belt which is raised and supported by means of the truss Q, as just described, enters the upper portion of one of the loading towers, the upper end of the truss Q being connected with the cage of the shuttle conveyer hereinafter described so as to be raised and lowered therewith and always maintain a fixed relation thereto. In so doing the belt is held under proper tension, being suitably reeved through guide pulleys, in well known ways. As clearly shown in the drawings the upper end of the inclined portion of the belt K delivers to a hopper J' provided with chutes $j$, $j'$, delivering in opposite directions to the conveyer carried by the shuttle. In order to preserve a proper relation between the inclined portion of the belt and the horizontal portion thereof, the truck R, before referred to, is so associated with the truss Q that the belt is held suitably to merge smoothly from a horizontal to an inclined condition. The towers are movable back and forth along the bulkheads, piers or docks and while being so moved do not in any way interfere with the proper relation between the inclined portion of the conveyer belt and the horizontal portion thereof. This organization is of importance because it is very desirable that material, such as coal, should be conveyed from one end of the system to the other with the least number of transfers to the different mechanisms. Therefore I employ conveyer belts of great length, but which are so supported, guided and adjusted that the loading towers may be placed in any desired position throughout the length of the belt and deliver to ships, barges or vessels located anywhere alongside with the least number of transfers and the least breakage of material. I may employ similar belts for conveying the material from the lowering bin or from the storage bin to the trimmers.

Each tower J is provided with a horizontally arranged cage S which is vertically adjustable (Fig. 14) and supports a shuttle S' which is horizontally adjustable in the cage and is equipped with a conveyer belt $S^2$ which may be operated in any suitable way and delivers to a lowerator T, a chute T', or any other suitable device for conveying the material to a vessel U or other receptacle. The lowerator T is suspended by tackle $t$ from a boom $T^2$, which may be raised and lowered or moved to any desired extent, and the chute T' is similarly suspended from a boom $T^2$ which may be raised and lowered by tackle $t'$. It will be understood that a chute, lowerator or other suitable conveyer may be used on either or both booms, or the material may be delivered directly from the end of the shuttle to its final destination.

When it is desired to prevent as much as possible the breakage of the material I preferably employ a lowerator of the kind shown in Fig. 18. This comprises a casing V within which is mounted endless chains $v$ carrying wings $v'$ hinged at $v^2$ to the chains, guided at their inner ends by guides $v^3$ and at their outer ends by similar guides $v^4$. These chains are driven in any suitable way and in such manner as to cause the wings to descend on one side at a moderate speed so as to deliver the material gently to the place of storage. The material is received by the wings from the conveyer $S^2$ when the wings are distended as shown. When the loaded wings reach the bottom of the casing V they deliver through an opening therein and as the wings ascend in the casing they are folded as shown, thus economizing space. When the wings pass over the top of the casing they assume their extended positions and receive additional charges of the material.

The loading towers may be moved back and forth on the piers or along the bulkheads and the vessels may be loaded therefrom in the manner before described.

The mechanism carried by the loading towers is large and heavy and of large capacity. When vessels of small capacity are to be loaded or when it is desired to trim or complete the loading of larger vessels, or to bunker vessels of any size, it is more economical to employ loading apparatus of small dimensions and requiring less power. For these purposes I employ trimmers W located at various points along the piers or along the bulkheads, or they may be located on piles $P^{10}$ (Fig. 12), or on warehouses $P^{11}$ (Fig. 13) or in any other suitable place. These trimmers may be supplied from the lowering apparatus C direct, but preferably supplied from the storage bins N, hereinbefore referred to, and from which lead conveyer belts O. These trimmers may be all of substantially the same construction and a description of one of them will be sufficient.

As shown in Figs. 19 and 20 a frame $w$, composed of a lower horizontal portion and an upwardly inclined portion and mounted on wheels $w'$ traversing tracks $p$ supports a turntable $w^2$ from which rises a frame $w^3$ supporting a hopper Z which receives the material from the upwardly inclined portion $o$ of the endless belt O which is reeved through the trimmer frame and which delivers the material to a conveyer $z$ carried by a boom Z' hinged to the frame $w^3$ and supported in any suitable way as by screws or tackle $z'$ by means of which it may be raised and lowered to the desired extent. The trimmer may be moved back and forth to any desired extent along the piers, bulkheads, pile platforms or warehouses and it may be turned as much as required at any time and the delivery end of the conveyer z may be elevated and lowered as required.

The drawings illustrate most clearly the manner in which the material is taken from cars, delivered to storage bins, or to the loading towers or to the trimmers and they show a convenient distribution of the belts, towers and timmers, but it will be understood that these may be arranged in other ways to accommodate varying conditions.

I have not, of course, illustrated or described all of the details involved in equipping and operating a loading system such as indicated in the drawings which necessarily involves a multitude of details which form no part of my invention. It will be understood that suitable motors are employed for operating the various movable parts and any approved mechanism may be used for driving the conveyers and for moving the towers and trimmers from place to place. Such parts of the apparatus or system as I consider novel and of importance are clearly illustrated and have been sufficiently described.

In copending applications for patents I have claimed certain parts of the apparatus herein shown and described. These applications are as follows:

Serial No. 88,665, filed Apr. 3, 1916.
Serial No. 89,595, filed Apr. 7, 1916.
Serial No. 96,987, filed May 12, 1916.

They are for the most part divisions of my present application.

What I claim as my invention is:

1. In a system for handling coal and the like, apparatus having means for discharging the material to be handled and including a receiving member having a plurality of discharge openings, a place for storage, a plurality of loading machines having means for loading material into boats or the like, conveyers for carrying material from one of the discharge openings to storage and from another of said discharge openings to said loading machines, means whereby the conveyers leading to said last mentioned loading machines may be fed with material from storage, and additional conveyers extending from storage and leading to other loading machines.

2. The combination with a place for storage of a truss or bridge mounted at its lower or receiving end to swing about a vertical axis, a track concentric with said axis for supporting said truss or bridge, a conveyer carried by said truss and which delivers to storage, another truss or bridge longer than that first mentioned and which is pivotally mounted at its lower or receiving end to swing about a vertical axis and is provided with a conveyer having its receiving end close to the receiving end of the first-mentioned conveyer and delivering to storage, and another track concentric with the axis of said last-mentioned bridge and which supports the outer end thereof.

3. In a system for handling coal and like material, a store house provided with a plurality of bins, a plurality of belt-conveyers arranged beneath said bins and receiving material therefrom, unloading apparatus provided with means for delivering material to said conveyer belts, loading apparatus movable from place to place and receiving material from the conveyer belts, and a boom conveyer receiving material from the unloading apparatus and which is mounted to swing horizontally from bin to bin and which is adjustable vertically at its outer end to deliver material at any desired elevation in said bins.

4. In a system for handling material the combination with unloading apparatus, of a series of loading machines, a storage house between the unloading apparatus and the loading machines, and means for simultaneously supplying material to a plurality of the machines either from the unloading apparatus or from the storage house, including belts which convey from the unloading apparatus or storage house to certain of the machines and additional belts which lead to other loading machines and convey the material from the storage house.

5. In a system for handling material the combination with unloading apparatus, of a series of loading machines, a storage house, conveying means extending from the unloading apparatus to the storage house, conveying means extending from the latter to certain of the machines, additional conveying means extending direct from the unloading apparatus to other loading machines, and means for feeding material from the storage house to the last named conveying means.

6. In a system for handling material the combination with unloading apparatus, of tracks for loading machines, a series of loading machines movable along said tracks and adapted to discharge material at any desired point along the tracks, a storage house between the unloading apparatus and the loading machines, and belt conveyers parallel with the tracks running between the unloading apparatus and the storage house and between the unloading apparatus, storage house and the loading machines.

In testimony whereof, I have hereunto subscribed my name.

FRANCIS LEE STUART.

Witnesses:
E. R. SPARKS,
A. H. SCHAEFFER.